(12) United States Patent
Wong et al.

(10) Patent No.: US 7,709,071 B2
(45) Date of Patent: May 4, 2010

(54) LABEL SHEET DESIGN FOR EASY REMOVAL OF LABELS

(75) Inventors: Galen Wong, South Pasadena, CA (US); Steven C. Weirather, Lawrenceville, GA (US); Jerry Hodsdon, Forestdale, MA (US); Inge Bachner, Wackersberg (DE); Martin Utz, München (DE)

(73) Assignee: Avery Dennison Corporation, Pasadena, CA (US)

( * ) Notice: Subject to any disclaimer, the term of this patent is extended or adjusted under 35 U.S.C. 154(b) by 171 days.

(21) Appl. No.: 10/504,600

(22) PCT Filed: Feb. 28, 2003

(86) PCT No.: PCT/US03/05996

§ 371 (c)(1),
(2), (4) Date: Aug. 12, 2004

(87) PCT Pub. No.: WO01/84550

PCT Pub. Date: Nov. 8, 2001

(65) Prior Publication Data

US 2005/0089663 A1    Apr. 28, 2005

(51) Int. Cl.
  *B32B 9/00* (2006.01)
  *B32B 23/02* (2006.01)
  *B65D 65/28* (2006.01)
  *G09F 3/00* (2006.01)
  *G09F 3/10* (2006.01)

(52) U.S. Cl. ................... 428/40.1; 428/42.1; 428/42.2; 428/42.3; 428/43; 428/192; 428/194; 40/340; 40/638

(58) Field of Classification Search ............... 428/40.1, 428/42.1, 42.2, 42.3, 43, 192, 194; 40/340, 40/638
See application file for complete search history.

(56) References Cited

U.S. PATENT DOCUMENTS 2,276,297 A    3/1942    Flood (Continued)

FOREIGN PATENT DOCUMENTS

DE    29613123    * 11/1996

(Continued)

OTHER PUBLICATIONS

Aug. 22, 2003 International Search Report in corresponding International patent application No. PCT/US03/05996.

(Continued)

*Primary Examiner*—Victor S Chang

(57) ABSTRACT

A label sheet (1) having a release liner (16) and a column of labels (12) releasably adhered thereto is modified to allow easy removal of the labels. The liner has a weakened separation line (30) formed by cuts and ties running underneath a column of labels near the edge of the labels, and notches (18) at the top and bottom of the sheet aligned with the cuts and ties. A matrix (14) surrounding the labels, if present, also has cuts and ties, with the cuts and ties in the matrix parallel to and slightly offset from the cuts and ties in the liner. The separation lines are strong enough that the label sheet can be fed through a printer, yet weak enough that a user can tear off the liner and matrix along the separation lines, thus leaving a minor edge of a column of labels exposed for easy removal from the label sheet.

33 Claims, 6 Drawing Sheets

U.S. PATENT DOCUMENTS

| | | | |
|---|---|---|---|
| 2,303,346 A | | 12/1942 | Flood |
| 2,331,019 A | | 10/1943 | Flood |
| 2,434,545 A | | 1/1948 | Brady, Jr. et al. |
| 2,679,928 A | | 6/1954 | Bishop, Jr. et al. |
| 2,765,205 A | * | 10/1956 | Capella et al. ............... 312/91 |
| 2,883,044 A | | 4/1959 | Kendrick |
| 3,038,597 A | | 6/1962 | Brady, Jr. |
| 3,480,198 A | * | 11/1969 | Repko ...................... 383/203 |
| 3,568,829 A | | 3/1971 | Brady, Jr. |
| 3,822,492 A | | 7/1974 | Crawley |
| 3,896,246 A | | 7/1975 | Brady, Jr. |
| 3,914,483 A | | 10/1975 | Stipek, Jr. |
| 4,032,679 A | | 6/1977 | Aoyagi |
| 4,217,164 A | | 8/1980 | La Mers |
| 4,264,662 A | | 4/1981 | Taylor et al. |
| 4,428,857 A | | 1/1984 | Taylor et al. |
| 4,524,095 A | | 6/1985 | Gocket et al. |
| 4,648,930 A | | 3/1987 | La Mers |
| 4,706,877 A | | 11/1987 | Jenkins |
| 4,881,935 A | | 11/1989 | Slobodkin |
| 4,881,936 A | | 11/1989 | Slobodkin |
| 4,910,058 A | | 3/1990 | Jameson |
| 4,951,970 A | | 8/1990 | Burt |
| 4,952,433 A | | 8/1990 | Tezuka et al. |
| 5,011,559 A | | 4/1991 | Felix |
| 5,091,035 A | | 2/1992 | Anhaeuser |
| 5,182,152 A | | 1/1993 | Ericson |
| 5,230,938 A | | 7/1993 | Hess et al. |
| 5,324,153 A | | 6/1994 | Chess |
| 5,328,538 A | | 7/1994 | Garrison |
| 5,389,414 A | | 2/1995 | Popat |
| 5,407,718 A | | 4/1995 | Popat et al. |
| 5,484,168 A | | 1/1996 | Chigot |
| 5,520,990 A | | 5/1996 | Rotermund |
| 5,536,546 A | | 7/1996 | Nash |
| 5,633,071 A | | 5/1997 | Murphy |
| 5,658,631 A | | 8/1997 | Bernstein et al. |
| 5,686,159 A | | 11/1997 | Langan |
| 5,700,535 A | | 12/1997 | Galsterer et al. |
| 5,756,175 A | | 5/1998 | Washburn |
| 5,788,284 A | | 8/1998 | Hirst |
| 5,947,525 A | | 9/1999 | Pollman |
| 5,997,683 A | | 12/1999 | Popat |
| 6,001,209 A | | 12/1999 | Popat et al. |
| 6,004,643 A | | 12/1999 | Scheggetman |
| 6,132,829 A | | 10/2000 | Kennerly et al. |
| 6,136,130 A | | 10/2000 | Tataryan et al. |
| 6,170,879 B1 | | 1/2001 | Rawlings |
| 6,284,708 B1 | | 9/2001 | Oshima et al. |
| 6,361,078 B1 | | 3/2002 | Chess |
| 6,391,136 B1 | | 5/2002 | Stickelbrocks |
| 6,403,184 B1 | | 6/2002 | Michlin |
| 6,410,111 B1 | | 6/2002 | Roth et al. |
| 6,413,604 B1 | | 7/2002 | Matthews et al. |
| 6,579,585 B1 | | 6/2003 | Garvic et al. |
| 6,656,555 B1 | | 12/2003 | McKillip |
| 6,803,084 B1 | * | 10/2004 | Do et al. .................... 428/40.1 |
| 6,837,957 B2 | | 1/2005 | Flynn et al. |
| 6,860,050 B2 | | 3/2005 | Flynn et al. |
| 6,905,747 B2 | | 6/2005 | Auchter et al. |
| 6,926,942 B2 | | 8/2005 | Garvic et al. |
| 2002/0086127 A1 | | 7/2002 | Hodsdon et al. |
| 2002/0096874 A1 | | 7/2002 | Viby |
| 2004/0033326 A1 | | 2/2004 | Tataryan et al. |
| 2004/0050854 A1 | | 3/2004 | Presutti et al. |
| 2004/0101646 A1 | | 5/2004 | Hodsdon et al. |
| 2004/0101648 A1 | | 5/2004 | Mulvey et al. |
| 2004/0213943 A1 | | 10/2004 | Viby |
| 2006/0110565 A1 | | 5/2006 | Tataryan et al. |
| 2006/0210754 A1 | | 9/2006 | Presutti et al. |
| 2007/0114789 A1 | | 5/2007 | Morrish |

FOREIGN PATENT DOCUMENTS

| | | |
|---|---|---|
| EP | 0418608 | 3/1991 |
| EP | 0765514 | 4/1997 |
| EP | 1551621 | 7/2005 |
| GB | 2177373 | 1/1987 |
| JP | 56145069 | 11/1981 |
| JP | 6011370 | 1/1985 |
| JP | 6443380 | 3/1989 |
| JP | H0511575 | 3/1993 |
| JP | 07-306641 | 11/1995 |
| JP | 08137403 | 5/1996 |
| JP | 11030954 | 2/1999 |
| JP | 11045051 | 2/1999 |
| JP | 2001-101827 | 4/2001 |
| JP | 200282615 | 3/2002 |
| JP | 2005-128458 | 5/2005 |
| WO | 2001-84550 | 1/1993 |
| WO | 97/01495 | 1/1997 |
| WO | 2000032412 | 6/2000 |
| WO | 01/89825 | 11/2001 |
| WO | WO 01/84550 | 11/2001 |
| WO | WO 01/89825 | 11/2001 |
| WO | 02/26483 | 4/2002 |
| WO | 1999031644 A1 | 11/2007 |

OTHER PUBLICATIONS

European Patent Office, Christopher Pierron, Supplementary European Search Report, Appln. No. 03713742.9-2214 PCT/US0305996, Oct. 4, 2007.

Office action dated Oct. 1, 2009 from corresponding Canadian Application No. 2,512,250.

International Search Report and Written Opinion dated Dec. 4, 2009 from International Application No. PCT/US2009/041586.

Observations by Third Parties under Article 115 EPC filed on Oct. 20, 2009 by Mintz Levin from corresponding European Application No. 03713742.9.

* cited by examiner

LABEL SHEET DESIGN FOR EASY REMOVAL OF LABELS

RELATED APPLICATIONS

This application claims priority from International Application No. PCT/US03/05996 filed Feb. 28, 2003.

FIELD OF THE INVENTION

The present invention relates to label sheets. More particularly, the present invention relates to a design for label sheets in which the labels may be easily removed.

BACKGROUND OF THE INVENTION

Address labels on printable 8½×11 and A4 sheets have been in use for a number of years as a means of printing a medium to large number of addresses or other information in a relatively short period of time. After the label sheets have been printed, these labels must then be removed from the sheet and applied to an envelope or other substrate. The standard method for removing the labels by hand is that the user bends back the label sheet somewhere in the vicinity of one of the edges or corners of the first label to be removed. This causes a separation between the label and the liner. The user grasps the label in the area where the separation has been created, and removes the label from the sheet. This operation is then repeated for each label. This operation can be somewhat difficult and time consuming, and requires a fair amount of manual dexterity. In addition, some combinations of materials such as a thin or flexible face and thick paper liner can be difficult to die cut without cutting into the liner. When the die cut extends into the liner, the user can accidentally tear off a section of the liner in the process of removing the label from the liner.

Label strips or webs have also been invented for use with automated label removal and placement machinery. U.S. Pat. No. 5,788,284 issued to Hirst discloses a label strip with a cut running down the centerline of the release liner and underneath the center of the individual labels. The label strip moves over a V-shaped notch in a separator plate, thereby automatically separating the labels from the release liner.

U.S. Pat. No. 5,182,152 issued to Ericson discloses a Bible index label dispensing sheet having a weakened line in the backing and fold lines in the individual labels. A release strip overlies the weakened backing line on one side of each horizontal row of labels. The release strip acts as an adhesive tape to prevent premature rupture of the sheet. The user grasps and pulls away the release strip, and tears off the backing from a portion of the horizontal row of labels.

SUMMARY OF THE INVENTION

The present invention provides a label sheet assembly which may be fed through a printer such as a laser printer, an ink jet printer, or other printer attached to a personal computer, for desktop printability. Thereafter, a narrow strip of the release liner can be torn off in a single motion. This exposes a narrow strip of each label within a row or column of labels, allowing the labels to be easily removed and placed on some other object or substrate one-by-one. In a label sheet which has a border or matrix surrounding the labels and/or running between the labels or portions of the labels, both the release liner and the matrix have weakened separation lines therein. The separation lines are formed by a series of cuts and ties in the release liner and in the matrix. The ties are preferably strongest near the edges of the sheet and weaker in the interior portion of the sheet. This allows the sheet to resist tearing along the weakened separation lines due to normal handling or printing in the printer, but once the tearing has begun the tearing continues easily until an entire strip of the release liner has been stripped away. A notch is preferably formed in a release liner and the matrix if applicable at each end of the weakened separation line. The notch is aligned with the weakened separation lines in both the liner and in the matrix. The notch helps to ensure that tearing will begin along the weakened separation lines. The two separation lines are sufficiently close together that the user can tear away the strip of release liner from the remainder of the sheet in a single motion without having to remove a separate release strip, and the tearing, once begun, will continue until the release liner is torn entirely away from the remainder of the sheet. The size of the cuts and the size of the ties are chosen so that the assembly is strong enough to be fed through a printer such as a laser printer or an ink jet printer, but weak enough so that the user can tear off the release liner strip along the separation line in an easy and fluid motion without any other mechanical preparation of the label sheet between the printing and the tearing steps. The ratio of cut length to overall separation line length is greater than 95% to ensure ease of separation. Preferably, the separation line lies approximately 0.6 centimeters (approximately ¼ inch) from the edge of a column or column of labels. In this way there is sufficient overhang of the exposed portion of the labels that a user can easily grasp the labels, but a sheet of labels which has had one column or column of labels partially exposed will not have so much exposed adhesive area that the label sheet will readily stick to a desk or other surface on which the label sheet is placed.

In one aspect therefore the invention is of a label sheet assembly modified for easy removal of labels by hand, comprising a release liner and a sheet of facestock material releasably adhered to the release liner, the facestock material including at least a first column of labels formed therein and a matrix at least partially bordering the labels, wherein a first weakened separation line is formed in the release liner below the column of labels and offset from a center of the column of labels toward an edge of the labels, and a second weakened separation line is formed in the matrix running generally parallel to the first weakened separation line. The release liner has a notch aligned with the two weakened separation lines, and preferably a notch at either end of the separation lines. The weakened separation lines are offset from each other by a short distance so that a user can tear off a strip of the liner and a strip of the matrix in a single motion leaving each label within the column of labels with a portion of its liner removed, thereby allowing easy removal of the labels from the label sheet assembly after the tearing operation without the need for the user to perform any other physical preparation of the label sheet between the printing and tearing operations. The weakened separation lines are preferably formed by cuts and ties in the liners and cuts and ties in the matrix when present, with the strongest of the ties being positioned next to the edges of the assembly or the notch when present. For label sheets having multiple columns of labels, the sheet has a weakened separation line in the liner and in the matrix when present below each column of labels.

Exemplary embodiments of the invention will be further described below with reference to the drawings, in which like numbers refer to like parts.

DETAILED DESCRIPTION OF EXEMPLARY EMBODIMENTS

Figure 1:
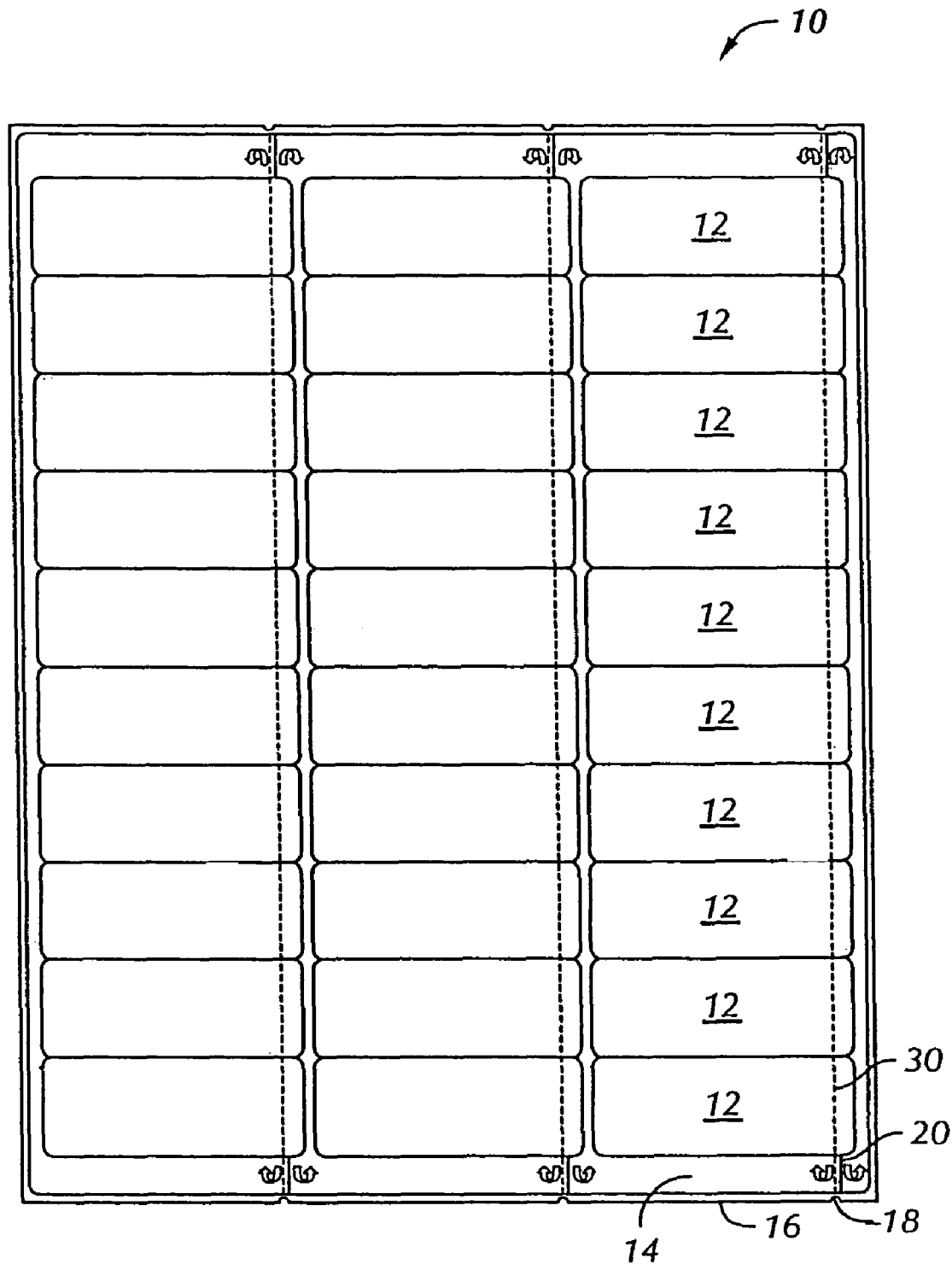
FIG. 1 is a plan view of the label sheet according to a first embodiment of the present invention.

FIG. 1 shows label sheet assembly 10 in which the labels can be easily peeled according to a first embodiment of the present invention. The label assembly 10 is preferably of an overall standard size such as 8½ inches by 11 inches, or A4 (approximately 21 cm×29.7 cm), or 4 inches by 6 inches, or other size compatible with standard printers used with personal computers. Assembly 10 includes a release liner sheet or simply release liner 16 with a sheet of facestock material releasably adhered thereto via a pressure sensitive adhesive. The release liner 16 is coated with a thin layer of release material such as silicone, or is otherwise constructed or treated such that the labels can be easily removed therefrom. The sheet of facestock material comprises a generally rectangular sheet of paper or film facestock with a plurality of labels 12 formed therein such as by die cutting. The section of the facestock sheet not used for labels constitutes the border or matrix 14. In the figure the facestock sheet is shown smaller than the release liner 16, although it is not necessary that the facestock sheet be smaller than the release liner. Additionally, although the assembly 10 is shown with a matrix, it is not necessary for the invention that the label assembly 10 includes a matrix 14 surrounding and/or between labels 12.

Figure 2:
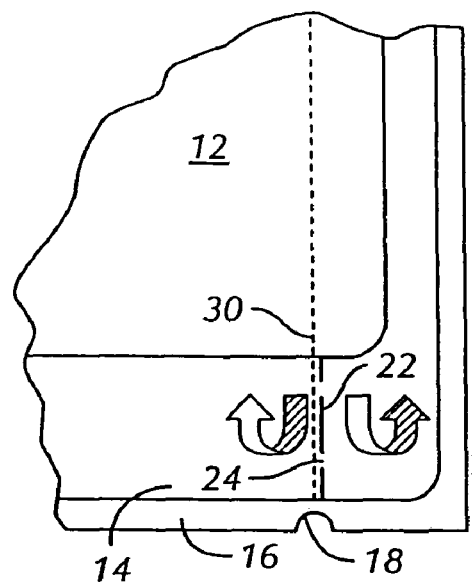
FIG. 2 is a close up of the lower right hand corner of the label sheet of FIG. 1.

FIG. 2 shows a close up of the lower right hand corner of the label assembly 10 of FIG. 1. The matrix 14 has a weakened separation line 20 formed therein near one edge of the column of labels. Matrix separation line 20 includes a plurality of cuts 22 and a plurality of small ties 24. The liner includes a weakened separation line 30 which is shown in phantom in FIG. 2. This weakened separation line or liner separation line 30 runs generally from one edge of the assembly 10 to an opposite edge of the assembly 10 and runs preferably linearly beneath labels 12 along a column of labels, near an edge of the labels. Preferably liner separation line 30 runs less than one centimeter from the edge of the labels, and more preferably approximately 0.6 centimeters (approximately ¼ inch) from the edge of the labels. Liner separation line 30 is shown running vertically underneath a column of labels; however, the assembly can alternatively be constructed such that the separation lines run horizontally beneath a row of labels. Liner 16 also optionally includes a notch 18 generally in alignment with the liner separation line 30 and the cuts and ties 22/24 in matrix 14. As shown in FIG. 1, a similar structure of weakened separation lines and notches is created at the top right hand corner of the assembly. Additionally, assembly 10 includes two other sets of weakened separation lines and notches, one set for each column of labels with the weakened separation lines running underneath the column of labels at approximately 0.6 centimeters from one edge thereof. If the assembly 10 had been laid out to include a different number of columns of labels, e.g. two columns, four columns, five columns, etc., the assembly would include a corresponding number of sets of separation lines and notches. Arrows printed on the facestock material instruct or encourage the user to begin tearing the assembly at notches 18. Alternatively, other instructional indicia or written instructions, such as the words "Tear Here" or the like, could be printed on the assembly.

Figure 4:
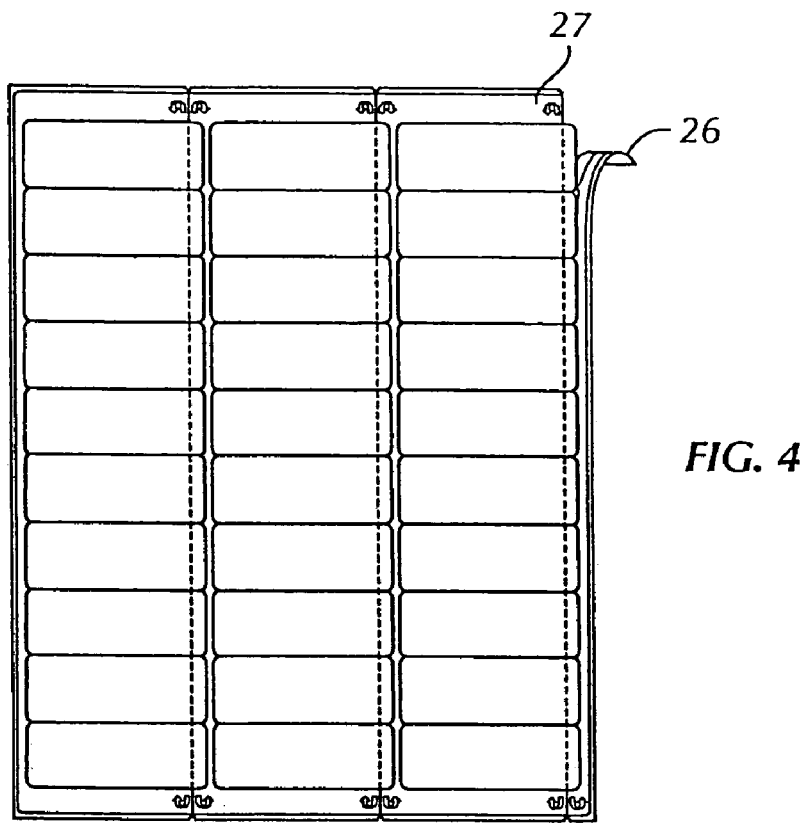
FIG. 4 shows a first method of using the label sheet of FIG. 1.

The distance between liner separation line 30 and the cuts and ties 22/24 in the matrix which form matrix separation line 20 is exaggerated in the figures for illustration purposes. The separation lines in the liner and in the matrix are preferably placed close enough together such that, after assembly 10 has been printed on by a printer, a user can tear off the strip 26 of liner and matrix as illustrated in FIG. 4 in a single fluid motion without any further physical preparation of assembly 10 being required between the printing and the tearing steps. At the same time, the separation lines are slightly separated so that the portion of the matrix overlying liner separation line 30 helps to keep liner 16 from prematurely tearing, and the portion of the liner underneath matrix separation line 20 helps to keep the matrix from prematurely tearing. Another reason for offsetting the two separation lines has to do with the manufacturing process. If the separation line in the facestock were to be die cut directly over the separation line in the liner, the die pressing into the facestock would have a tendency to deform the facestock material rather than cut cleanly into it because there would be insufficient liner strength to support the dies cutting into the facestock. Therefore, the two separation lines are preferably offset by enough distance such that normal manufacturing tolerances are unlikely to produce a cut-on-cut situation. Preferably, matrix separation line 20 is offset the liner separation line 30 by less than 5 mm; more preferably, the two are separated by less than 2 mm; more preferably still, the two are separated by less than 1 mm. It has been found that an offset distance of approximately 0.5 mm produces good results for typical sheets of paper labels. However, the exact separation distance is not critical. Furthermore, the preferred separation distance can vary depending upon the thickness and strength of the liner and matrix, the strength of the pressure sensitive adhesive and the effectiveness of the release liner, the overall size of the assembly, and other factors.

Figure 3:
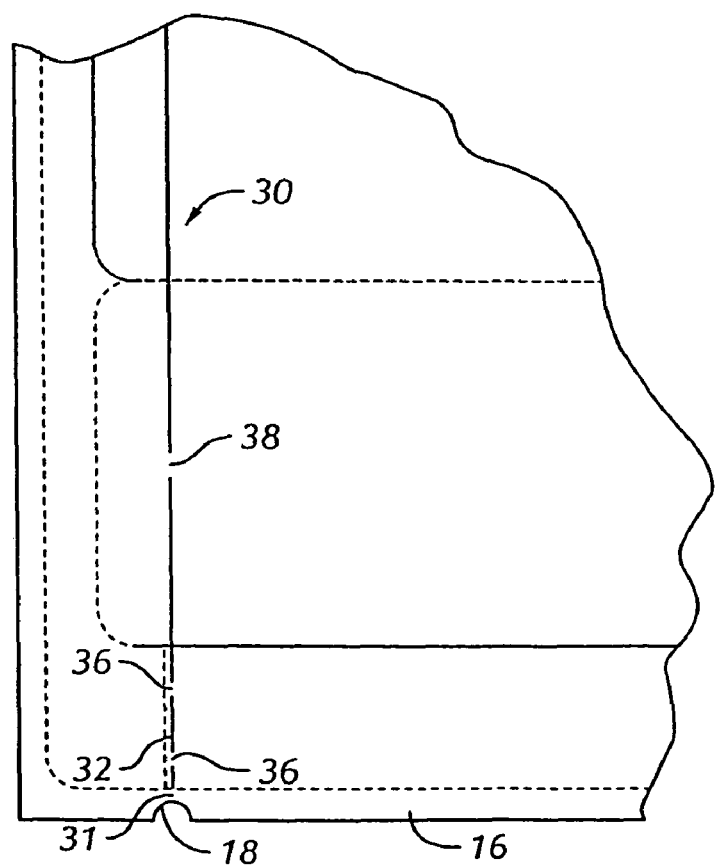
FIG. 3 shows the back side of the portion of the label sheet shown in FIG. 2.

FIG. 3 shows the back side of the lower right hand corner of the label assembly 10 illustrated in FIG. 2. Liner separation line 30 is illustrated in greater detail. It includes a plurality of cuts 32, and plurality of ties 36 and 38. In the embodiment shown two small ties 36 lie underneath the matrix, and one small tie 38 lies underneath each label 12. The particular locations of the ties are not critical. Additionally, release liner 16 includes a large tie 31 near notch 18 or, if no notch is present, near the edge of release liner 16.

Both the matrix separation line 20 and the liner separation line 30 run parallel to the edge of a column of labels and disposed about 0.6 centimeters from the edge of the column. The exact distance is not critical. Preferably, however, the separation lines are offset from the edge of the column of labels far enough so that when strip 26 is removed labels 12 can be easily grasped and removed by the user. At the same time, the separation lines are close enough to the edge of the labels such that when strip 26 is removed a narrow enough edge of the labels is exposed so that when the label sheet is placed onto a table or similar surface, the exposed edge of the unremoved labels 12 do not easily and inadvertently stick to the table.

Figure 5:
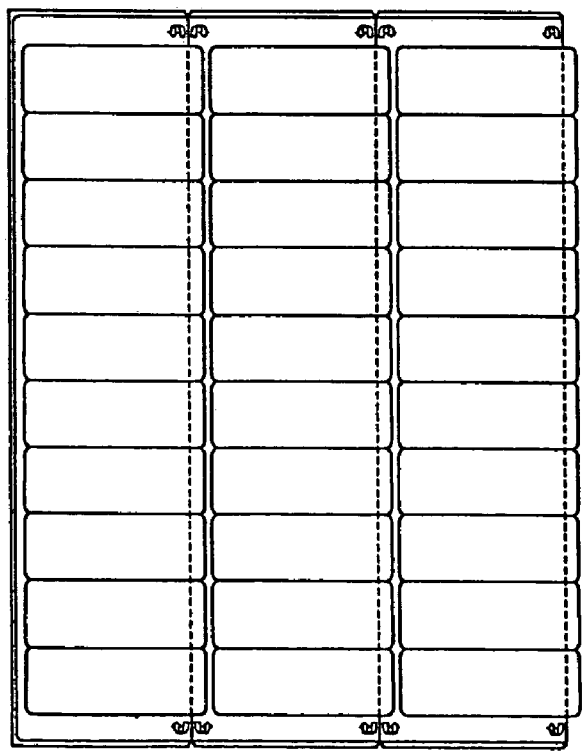
FIG. 5 shows the label sheet of FIG. 4 after strip 26 has been completely removed.

The purpose of these structures will now be described with reference to FIGS. 3, 4 and 5. FIG. 4 shows one method of using the label sheet assembly of FIG. 1. For purposes of this discussion, it will be assumed that the upper right hand corner of label assembly 10 has a structure that is the mirror image of the structure shown in FIG. 2, with corresponding parts having the same reference designators. The user grasps one corner of label assembly 10 at approximately position 27 with one thumb and forefinger, and with the other thumb and forefinger grasps the narrow strip 26 of release liner and matrix so as to focus the shear forces at notch 18 and large tie 31, and begins tearing strip 26 away from the rest of the sheet. After large tie 31 is broken, the tearing away of matrix liner strip 26 progresses relatively easily through small ties 36 and 38 within release liner 16, and through small ties 24 within matrix 14, until strip 26 is completely torn off. This leaves the label assembly 10 as shown in FIG. 5, i.e., with one column of labels 12 mostly attached to the release liner 16 but having a relatively narrow strip of the labels with the underlying liner portion removed. The user can then easily peel off the individual labels 12 by hand one-by-one as desired without having to bend and manipulate the assembly 10 each time the user wishes to remove the next label.

Figure 6:
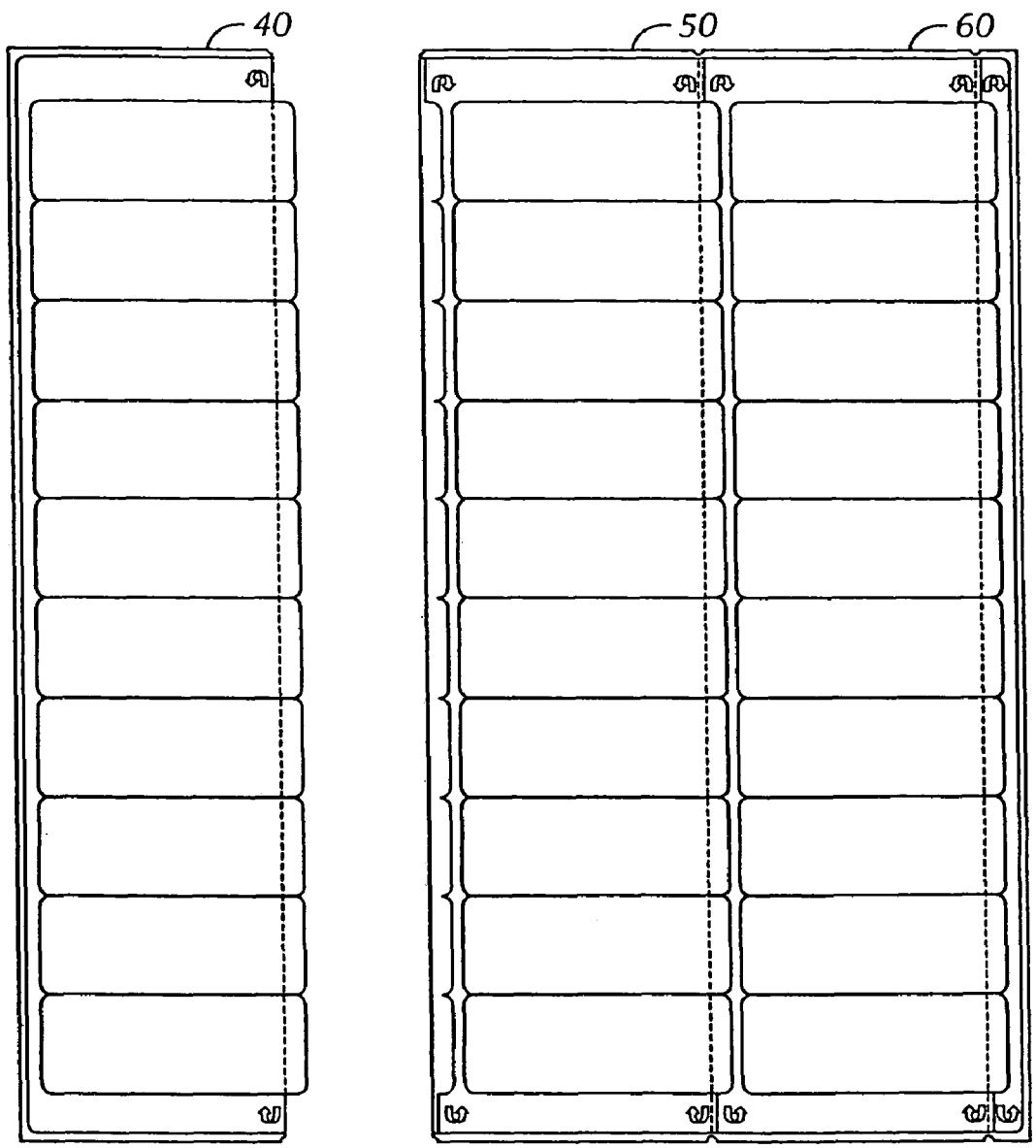
FIG. 6 shows a second method of using the label sheet of FIG. 1.

FIG. 6 shows a second method of using label sheet assembly 10 of FIG. 1. The assembly includes three sets of vertical separation lines, one set of separation lines associated with each column of labels. The separation lines divide the assembly into three individual portions 40, 50 and 60 which may be individually separated from each other. In FIG. 6, the left hand portion 40 has been separated from the center portion 50 and right hand portion 60. The labels within left hand portion 40 are now ready to be easily peeled one by one from the liner and applied to envelopes or other substrate. Sections 50 and 60 do not have any portions of the labels with their adhesive sides exposed. Thus, portions 50 and 60 can be handled and/or stored for later use without any degradation of the adhesive on the backs of those labels. Remaining portion 50/60 could even be fed through a printer for later printing. For example, if only ten or fewer labels needed to be printed and used, the user could run assembly 10 through the printer and print only on labels within the column of labels in section 40. The user would then separate section 40 and use the labels within that section. Remaining sections 50/60 would be stored for later use. When additional labels are ready to be printed, the label assembly could be fed through the printer beginning with the right hand edge of section 60. Alternatively, the software could be instructed to shift the printing of labels over to the right slightly from the normal position, such that section 50/60 could be fed through the printer beginning with the left hand side of section 50. The software could be commanded to make such an adjustment by a selectable software switch or option. Using this latter method, a first column of labels 40 could be printed, torn off, and used; at a later time a second column of labels 50 could be printed, torn off, and used; and at a later time still a third column of labels 60 could be printed and used.

Figure 7:
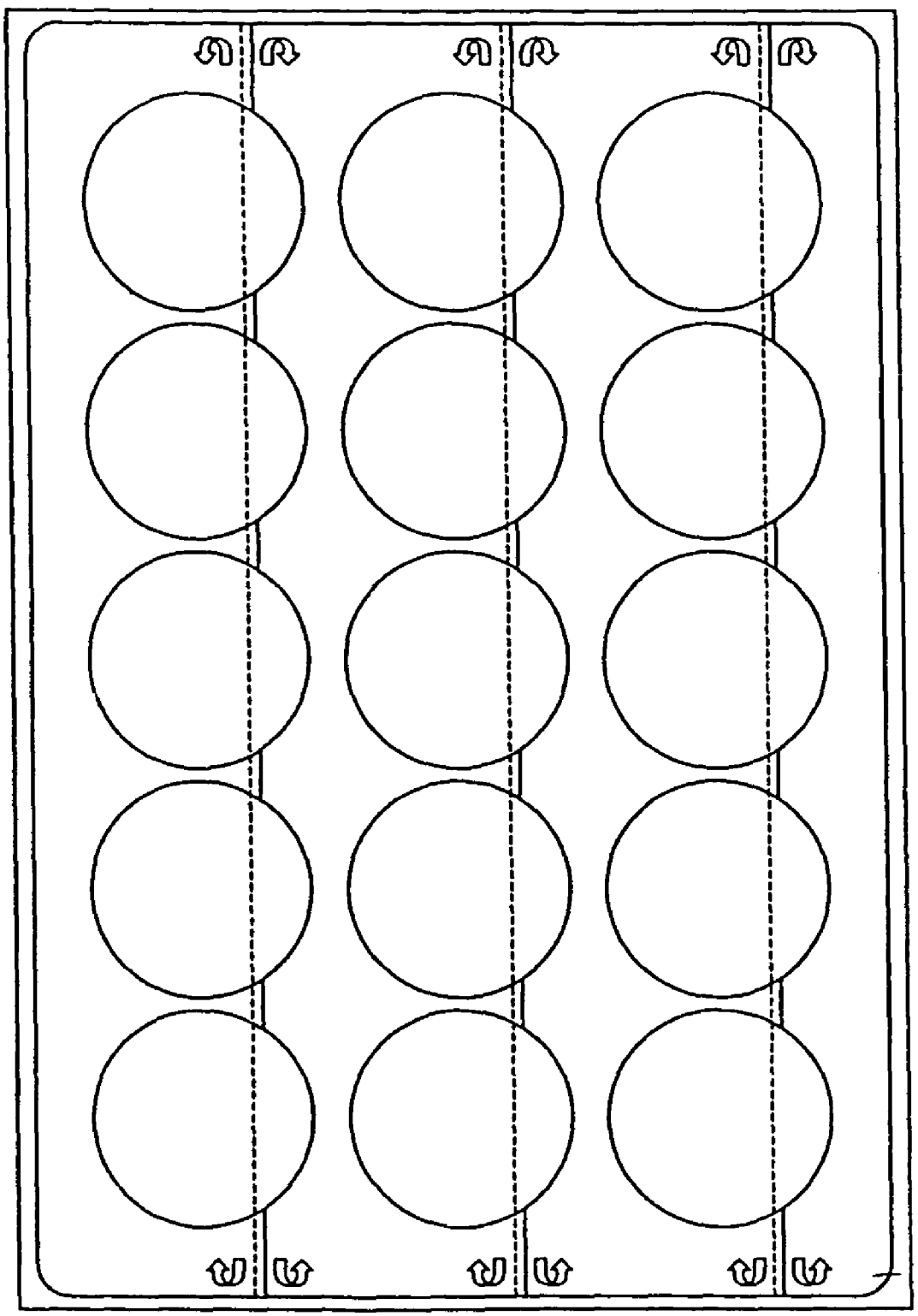
FIG. 7 shows a label sheet according to a second embodiment of the present invention.

Of course, the labels on the label sheet need not be generally rectangular in shape and butting against each other as in the first embodiment shown in FIG. 1. The labels could be virtually any shape and could be completely separated from each other by matrix therebetween or by bare liner. FIG. 7 shows one such possibility in which the labels are round and slightly separated one from another.

The size of the cuts and the size of the ties are chosen so that the assembly is strong enough to be fed through a printer such as a laser printer or an ink jet printer, but weak enough so that the user can tear off the release liner strip along the separation line in an easy and fluid motion without any other mechanical preparation of the label sheet between the printing and the tearing steps. The ratio of cut length to overall separation line length is greater than 95% to ensure ease of separation. It has been found that an average tensile strength of the facestock and liner along the separation lines of 6 gm/cm produces good results, and it is expected that values of about 4 gm/cm to 10 gm/cm would also produce good results, and that value of about 2 gm/cm to 15 gm/cm would also be acceptable.

Figure 8:
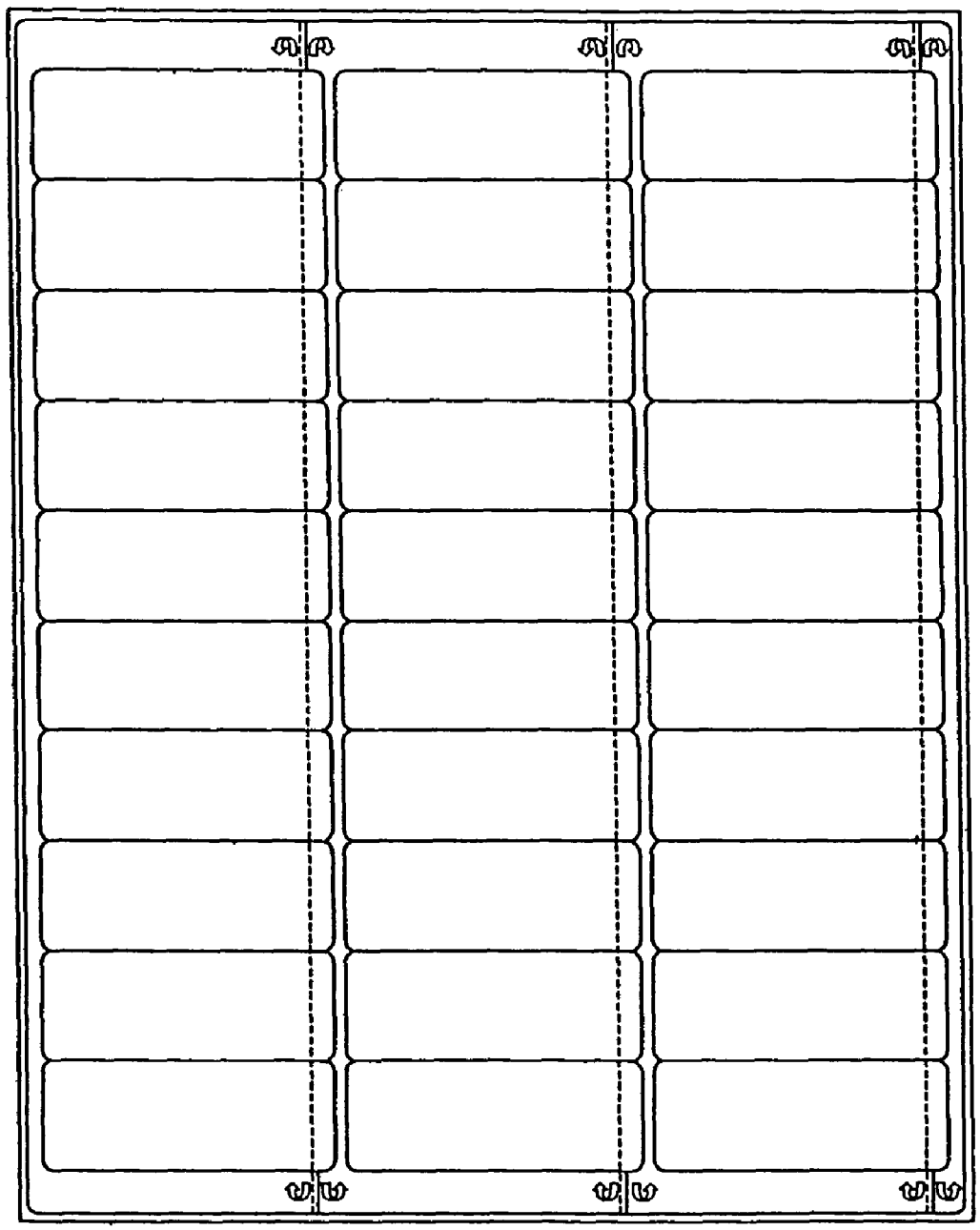
FIG. 8 illustrates a third embodiment of the invention without notches at the edges of the assembly.

FIG. 8 shows a third embodiment similar to the embodiment shown in FIG. 1, except that the label assembly does not include notches.

As shown in FIGS. 1 and 2, the facestock material is slightly smaller than the liner 16 such that matrix 14 does not extend to the edge of the label assembly. If the facestock were to extend to the edge of the label sheet, it would be desirable to form notch 18 in both matrix 14 and liner 16.

In yet another possible embodiment, the label assembly would not even include a matrix bordering the labels. In FIG. 1, for example, matrix 14 could be entirely stripped from the label sheet before the product is sold. Alternatively, the entire sheet of facestock material could be die cut such that the entirety of the facestock material formed labels. The facestock material could either take up the same amount of facestock area shown in FIG. 1, or a significantly smaller area. Regardless of how the facestock material were constructed, shaped, and cut, a label sheet without a matrix could still employ the present invention so that a narrow strip of liner material could be easily removed in a fluid motion from a number of labels at a single time, thus exposing a minor portion of those labels so that they could thereafter be easily removed from the remaining portion of the liner.

In a still further embodiment, the label sheet could be symmetrical. For example, a label sheet could include two columns of labels. For the right hand column of labels, separation lines would be offset slightly from the right hand edge of that right hand column of labels, and for the left hand column of labels, separation lines would be offset slightly from that left hand edge of the left hand column of labels.

Additionally, it will be understood that the present invention can be used with various types and media of labels such as metallic foil, clear plastic, MYLAR®, and other well known materials. The labels could be colored or clear, and could contain pre-printed indicia such as text, two dimensional graphic or photographic images, or holographic images. The invention could be used with a variety of printing devices including but not limited to printers for use with a personal computer.

The present invention is well suited for applications in which the labels will be individually removed by hand. However, the invention is not limited to hand use. The invention could be used with automated machinery for tearing strip 26 away and thereafter placing labels 12 on a substrate. The invention could also be used in applications in which a plurality of labels are to be positioned over one or more substrate objects and applied thereto as a group in the same relative positions on which those labels are found on label assembly 10.

It will be appreciated that the term "present invention" as used herein should not be construed to mean that only a single invention having a single essential element or group of elements is presented. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, different sizes of label assemblies could be used, either with or without matrices. The labels could be of various shapes and sizes, and need not all be of the same shape or size. The pressure sensitive adhesive could be weak or strong. The term "standard size" will be understood to mean approximately standard size, and "8½ in.×11 in." and "A4" and the like will be understood to mean approximately those sizes. The weakened separation lines could be formed by various known methods. The weakened separation lines are generally linear and parallel, but need not be strictly linear or strictly parallel. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A label sheet assembly comprising:
    a. a release liner; and
    b. facestock material that is releasably adhered to the release liner;
    c. wherein:
        i. the facestock material has formed therein a first label and a second label,
        ii. the first label has a shape and a surface that is adhered to the release liner,
        iii. the second label has a shape and a surface that is adhered to the release liner,
        iv. the first label and the second label are adjacent to one another and are separated by a cut in the facestock material,
        v. the cut in the facestock material between the first label and the second label defines at least a portion of the first label's shape and a portion of the second label's shape,
        vi. a portion of the release liner is configured to be separated from a part of the first label and a part of the second label with the majority of both the first label's surface and the second label's surface remaining adhered to another portion of the release liner, and
        vii. the label sheet assembly is configured to be placed on a flat surface after the separation of the portion of the release liner from the part of the first label without creating an adhesive bond between the first label and the flat surface.

2. The label sheet assembly according to claim 1, wherein the release liner includes a weakened separation line that underlies the first label and the second label.

3. The label sheet assembly according to claim 2, wherein:
    a. the first label has an edge; and
    b. the second label has an edge.

4. The label sheet assembly according to claim 3, wherein the weakened separation line is offset from the first label's edge and the second label's edge.

5. The label sheet assembly according to claim 3, wherein the weakened separation line underlies the first label less than one centimeter from the first label's edge.

6. The label sheet assembly according to claim 2, wherein the weakened separation line underlies the cur in the facestock material between the first label and the second label.

7. The label sheet assembly according to claim 2, wherein the weakened separation line is a straight line.

8. The label sheet assembly according to claim 2, wherein the release liner is configured to be separated from the part of the first label and the part of the second label along the weakened separation line.

9. The label sheet assembly according to claim 2, wherein the label sheet assembly is configured to be torn by a user along the weakened separation line, and in doing so, remove both a portion of the release liner and a portion of the facestock material, leaving a portion of the first label's surface exposed and a portion of the second label's surface exposed.

10. The label sheet assembly according to claim 2, wherein:
    a. the release liner has an edge; and
    b. the weakened separation line includes a tie at the release liner edge.

11. The label sheet assembly according to claim 2, wherein the facestock material includes a weakened separation line.

12. The label sheet assembly according to claim 11, wherein the facestock material's weakened separation line is generally parallel to the release liner's weakened separation line.

13. The label sheet assembly according to claim 11, wherein the label sheet assembly is configured to be simultaneously torn by a user along both the release liner's weakened separation line and the facestock material's weakened separation line.

14. The label sheet assembly according to claim 2, wherein the release liner's weakened separation line includes a plurality of cuts and a plurality of ties.

15. The label sheet assembly according to claim 2, wherein the weakened separation line includes at least one tie that underlies the first label and at least another tie that underlies the second label.

16. The label sheet assembly according to claim 2, wherein:
    a. the release liner further includes a notch;
    b. the notch is adjacent to and aligned with the weakened separation line; and
    c. the notch is configured to facilitate tearing by a user of the liner sheet along the weakened separation line.

17. The label sheet assembly according to claim 2, wherein the label sheet assembly is sufficiently strong along the weakened separation line so that the label sheet assembly can be fed through a printer without the liner sheet separating along the weakened separation line.

18. The label sheet assembly according to claim 1, wherein:
    a. the label sheet assembly further includes an edge;
    b. the label sheet assembly includes facestock material between the first label and the label sheet assembly's edge; and
    c. the facestock material between the label sheet assembly's edge and the first label is configured to be torn by a user.

19. A label sheet assembly comprising:
    a. a release liner;
    b. facestock material that is releasably adhered to the release liner; and
    c. a label sheet assembly edge;
    d. wherein:
        i. the facestock material has formed therein a first label and a second label,
        ii. the facestock material has formed therein a matrix between the first label and the label sheet assembly edge,
        iii. the first label is adhered to the release liner,
        iv. the second label is adhered to the release liner, v. the first label and the second label are adjacent to one another and are separated by a cut in the facestock material, vi. a portion of the release liner is configured to be separated from a part of the first label and a part of the second label so that a portion of the first label's surface and a portion of the second label's surface is exposed while the majority of both the first label's surface and the second label's surface remains adhered to another portion of the release liner, and vii. the label sheet assembly is configured to be placed on a flat surface after the separation of the portion of the release liner from the part of the first label without creating an adhesive bond between the first label and the flat surface.

20. The label sheet assembly according to claim 19, wherein the matrix is configured to be torn by a user.

21. The label sheet assembly according to claim 19, wherein:

a. the release liner includes a weakened separation line that underlines the first label and the second label; and b. the matrix overlies a portion of the weakened separation line.

22. The label sheet assembly according to claim 21, wherein both the matrix and the liner sheet are configured to be torn by a user when the liner sheet is torn by the user along the weakened separation line.

23. A label sheet assembly comprising:

a. a release liner; and b. facestock material that is releasably adhered to the release liner;

c. wherein:

i. the facestock material has formed therein a first label and a second label, ii. the first label has a surface that is adhered to the release liner, iii. the second label has a surface that is adhered to the release liner, iv. the first label is separated from the second label only by a single cut in the facestock material, v. a portion of the release liner is configured to be separated from a part of the first label and a pan of the second label so that a portion of the first label's surface and a portion of the second label's surface is exposed while the majority of both the first label's surface and the second label's surface remains adhered to another portion of the release liner, and vi. the label sheet assembly is configured to be placed on a flat surface after the separation of the portion of the release liner from the part of the first label without creating an adhesive bond between the first label and the flat surface.

24. The label sheet assembly according to claim 23, wherein:

a. the first label has a shape;

b. the second label has a shape; and c. the cut in the facestock material between the first label and the second label defines at least a portion of both the first label's shape and the second label's shape.

25. A label sheet assembly comprising:

a. a release liner; and b. facestock material that is releasably adhered to the release liner;

c. wherein:

i. the facestock material has formed therein a first label and a second label, ii. the first label has a shape and a surface that is adhered to the release liner, iii. the second label has a shape and a surface that is adhered to the release liner, iv. the first label and the second label abut one another and are separated from one another only by a single cut in the facestock material, v. the cut in the facestock material between the first label and the second label defines at least a portion of the first label's shape and a portion of the second label's shape, and vi. a portion of the release liner is configured to be separated from a part of the first label and a part of the second label so that a portion of the first label's surface and a portion of the second label's surface is exposed while the majority of both the first label's surface and the second label's surface remains adhered to another portion of the release liner, and vii. the label sheet assembly is configured to be placed on a flat surface after the separation of the portion of the release liner from the part of the first label without creating an adhesive bond between the first label and the flat surface.

26. A label sheet assembly comprising:

a. a release liner that includes a weakened separation line; and b. facestock material that is releasably adhered to the release liner;

c. wherein:

i. the facestock material has formed therein a first label and a second label, ii. the first label has a shape, an edge, and a surface, iii. the first label's surface is adhered to the release liner, iv. the second label has a shape, an edge, and a surface, v. the second label's surface is adhered to the release liner, vi the first label and the second label are adjacent to one another and separated by a cut in the facestock material, vii. the weakened separation line underlies the first label, the second label, and the cut in the facestock material, viii. the weakened separation line is offset from the first label's edge and the second label's edge, ix the weakened separation line underlies the first label and the second label less than one centimeter from the first label's edge and the second label's edge, respectively, x. the cut in the facestock material between the first label and the second label defines at least a portion of the first label's shape and a portion of the second label's shape, xi. the release liner is configured to be torn by a user along the weakened separation line, and in doing so, separate a portion of the release liner from a part of the first label and a part of the second label so that a portion of the first label's surface and a portion of the second label's surface is exposed while the majority of both the first label's surface and the second label's surface remains adhered to another portion of the release liner, and xii. the label sheet assembly is configured to be placed on a flat surface after the separation of the portion of the release liner from the part of the first label without creating an adhesive bond between the first label and the flat surface.

27. A label sheet assembly comprising;
a. a release liner that includes a weakened separation line; and
b. facestock material that is releasably adhered to the release liner and includes a weakened separation line;
c. wherein:
   i. the facestock material has formed therein a first label and a second label,
   ii. the first label has a shape, an edge, and a surface,
   iii. the first label's surface is adhered to the release liner,
   iv. the second label has a shape, an edge, and a surface,
   v. the second label's surface is adhered to the release liner,
   vi. the first label and the second label are adjacent to one another and separated by a cut in the facestock material,
   vii. the release liner's weakened separation line underlies the first label, the second label, and the cut in the facestock material,
   viii. the release liner's weakened separation line is offset from the first label's edge and the second label's edge,
   ix. the cut in the facestock material between the first label and the second label defines at least a portion of the first label's shape and a portion of the second label's shape,
   x. the facestock material's weakened separation line is generally parallel to the release liner's weakened separation line,
   xi. the label sheet assembly is configured to be torn by a user simultaneously along both the release liner's weakened separation line and the facestock material's weakened separation line so that a portion of the first label's surface and a portion of the second label's surface is exposed while the majority of both the first label's surface and the second label's surface remains adhered to the release liner, and
   xii. the label sheet assembly is configured to be placed on a flat surface after the portion of the first label's surface is exposed without creating an adhesive bond between the first label and the flat surface.

28. A label sheet assembly comprising:
a. a plurality of labels; and
b. release liner that is coupled to and underlies the plurality of labels;
c. wherein:
   i. each one of the plurality of labels has an end and a surface area,
   ii. each one of the plurality of labels abuts at least another one of the plurality of labels,
   iii. a first portion of the release liner is configured to separate from each one of the plurality of labels so that after the first portion of the release liner is separated from each one of the plurality of labels the end of each one of the plurality of labels no longer is coupled to the release liner while a second portion of the release liner continues to underlie and be coupled to a majority of the surface area of each one of the plurality of labels, and
   iv. the label sheet assembly is configured to be placed on a flat surface after the separation of the first portion of the release liner from each one of the plurality of labels without creating an adhesive bond between at least one of the plurality of labels and the flat surface.

29. The label sheet assembly according to claim 28, wherein the release liner includes a weakened separation line that defines a boundary between the first and second portions of the release liner.

30. A label sheet assembly comprising:
a. a release liner; and
b. a plurality of labels that is coupled to the release liner;
c. wherein:
   i. each one of the plurality of labels has an end and a surface,
   ii. each one of the plurality of labels abuts another one of the plurality of labels,
   iii. a first portion of the release liner is configured to separate from each one of the plurality of labels so that after the first portion of the release liner is separated from each one of the plurality of labels the end of each one of the plurality of labels no longer is coupled to the release liner and a second portion of the release liner continues to be coupled to a majority of the surface of each one of the plurality of labels, and
   iv. the label sheet assembly is configured to be placed on a flat surface after the separation of the first portion of the release liner from each one of the plurality of labels without creating an adhesive bond between at least one of the plurality of labels and the flat surface.

31. The label sheet assembly according to claim 30, wherein the release liner includes a weakened separation line that defines a boundary between the first and second portions of the release liner.

32. A label sheet assembly comprising:
a. a release liner having a weakened separation line; and
b. a plurality of labels that is coupled to the release liner and overlies at least a portion of the weakened separation line;
c. wherein:
   i. each of the plurality of labels has a surface,
   ii. at least one of the plurality of labels abuts another one of the plurality of labels,
   iii. the release liner is configured to be torn along the weakened separation line so that a portion of the release liner is decoupled from the surface of each of the plurality of labels while another portion of the release liner continues to be coupled to a majority of the surface of each of the plurality of labels, and
   iv. the label sheet assembly is configured to be placed on a flat surface after the portion of the release liner is decoupled from the surface of each of the plurality of labels without creating an adhesive bond between at least one of the plurality of labels and the flat surface.

33. The label sheet assembly according to claim 32, wherein:
a. the plurality of labels includes a first label and a second label;
b. the label sheet assembly further includes a cut between the first label and the second label;
c. the cut has a width; and
d. the first label is separated from the second label by only the width of the cut.

* * * * *

UNITED STATES PATENT AND TRADEMARK OFFICE
CERTIFICATE OF CORRECTION

PATENT NO. : 7,709,071 B2
APPLICATION NO. : 10/504600
DATED : May 4, 2010
INVENTOR(S) : Galen Wong et al.

It is certified that error appears in the above-identified patent and that said Letters Patent is hereby corrected as shown below:

In the Claims:

Claim 6, line 2: replace "cur" with --cut--.

Claim 23, paragraph v., line 2: replace "pan" with --part--.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,709,071 B2
APPLICATION NO. : 10/504600
DATED : May 4, 2010
INVENTOR(S) : Galen Wong et al.

Page 1 of 1

It is certified that error appears in the above-identified patent and that said Letters Patent is hereby corrected as shown below:

In the Claims:

Column 7, line 64, (Claim 6, line 2): replace "cur" with --cut--.

Column 9, line 43, (Claim 23, paragraph v., line 2): replace "pan" with --part--.

This certificate supersedes the Certificate of Correction issued June 8, 2010.

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,709,071 B2 | Page 1 of 1 |
| APPLICATION NO. | : 10/504600 | |
| DATED | : May 4, 2010 | |
| INVENTOR(S) | : Galen Wong et al. | |

It is certified that error appears in the above-identified patent and that said Letters Patent is hereby corrected as shown below:

On the title page, in section (87),
   replace "WO01/84550" with --WO04/78468--;
   replace "Nov. 8, 2001" with --Sep. 16, 2004--.

Signed and Sealed this
Twenty-fifth Day of January, 2011

David J. Kappos
*Director of the United States Patent and Trademark Office*

INTER PARTES REEXAMINATION CERTIFICATE (1249th)
United States Patent
Wong et al.

(10) Number: US 7,709,071 C1
(45) Certificate Issued: Mar. 21, 2016

(54) LABEL SHEET DESIGN FOR EASY REMOVAL OF LABELS

(75) Inventors: Galen Wong, South Pasadena, CA (US); Steven C. Weirather, Lawrenceville, GA (US); Jerry Hodsdon, Forestdale, MA (US); Inge Bachner, Wackersberg (DE); Martin Utz, München (DE)

(73) Assignee: CCL LABEL, INC., Framingham, MA (US)

Reexamination Request:
No. 95/001,351, May 4, 2010

Reexamination Certificate for:
Patent No.: 7,709,071
Issued: May 4, 2010
Appl. No.: 10/504,600
PCT Filed: Feb. 28, 2003
PCT No.: PCT/US03/05996
§ 371 (c)(1),
(2), (4) Date: Aug. 12, 2004
PCT Pub. No.: WO01/84550
PCT Pub. Date: Nov. 8, 2001

Certificate of Correction issued Jun. 8, 2010

(51) Int. Cl.
*B32B 9/00* (2006.01)
*B32B 23/02* (2006.01)
*B65D 65/28* (2006.01)
*G09F 3/00* (2006.01)
*G09F 3/10* (2006.01)
*B65C 9/26* (2006.01)
*G11B 23/40* (2006.01)

(52) U.S. Cl.
CPC .............. *G09F 3/0288* (2013.01); *B65C 9/265* (2013.01); *G11B 23/40* (2013.01); *B65C 2009/267* (2013.01); *Y10T 428/14* (2015.01); *Y10T 428/149* (2015.01); *Y10T 428/1486* (2015.01); *Y10T 428/1495* (2015.01); *Y10T 428/15* (2015.01); *Y10T 428/163* (2015.01); *Y10T 428/216* (2015.01); *Y10T 428/218* (2015.01); *Y10T 428/24777* (2015.01); *Y10T 428/24793* (2015.01)

(58) Field of Classification Search
None
See application file for complete search history.

(56) References Cited

To view the complete listing of prior art documents cited during the proceeding for Reexamination Control Number 95/001,351, please refer to the USPTO's public Patent Application Information Retrieval (PAIR) system under the Display References tab.

*Primary Examiner* — Carlos Lopez

(57) ABSTRACT

A label sheet (1) having a release liner (16) and a column of labels (12) releasably adhered thereto is modified to allow easy removal of the labels. The liner has a weakened separation line (30) formed by cuts and ties running underneath a column of labels near the edge of the labels, and notches (18) at the top and bottom of the sheet aligned with the cuts and ties. A matrix (14) surrounding the labels, if present, also has cuts and ties, with the cuts and ties in the matrix parallel to and slightly offset from the cuts and ties in the liner. The separation lines are strong enough that the label sheet can be fed through a printer, yet weak enough that a user can tear off the liner and matrix along the separation lines, thus leaving a minor edge of a column of labels exposed for easy removal from the label sheet.

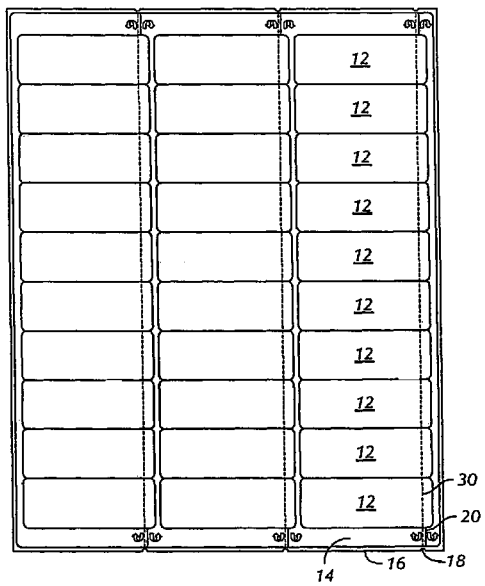

US 7,709,071 C1

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-33 are cancelled.

New claims 34-43 are added and determined to be patentable.

34. *A label sheet assembly comprising:*
   *a. a thin, flexible release liner that is a single sheet; and*
   *b. facestock material having a printable surface, a back surface, and a pressure-sensitive adhesive applied to the back surface, wherein the facestock material is releasable adhered to the release liner;*
   *c. wherein:*
      *i. the facestock material has formed therein a first label and a second label,*
      *ii. the first label has a shape and a surface that is adhered to the release liner,*
      *iii. the second label has a shape and a surface that is adhered to the release liner,*
      *iv. the first label and the second label are adjacent to one another and are separated by a cut in the facestock material,*
      *v. the cut in the facestock material between the first label and the second label defines at least a portion of the first label's shape and a portion of the second label's shape,*
      *vi. a portion of the release liner is configured to be separated from a part of the first label and a part of the second label with the majority of both the first label's surface and the second label's surface remaining adhered to another portion of the release liner,*
      *vii. the release liner includes a weakened separation line that underlies the first label and the second label,*
      *viii. the label sheet assembly is configured to be torn by a user along the weakened separation line, and in doing so, remove both a portion of the release liner and a portion of the facestock material, leaving a portion of the first label's surface exposed and a portion of the second label's surface exposed,*
      *ix. the label sheet assembly is configured to be placed on a flat surface after the separation of the portion of the release liner from the part of the first label without creating an adhesive bond between the first label and the flat surface, and*
      *x. the label sheet assembly is configured to be fed through a desktop printer.*

35. *A label sheet assembly comprising:*
   *a. a thin, flexible release liner that is a single sheet; and*
   *b. facestock material having a printable surface, a back surface, and a pressure-sensitive adhesive applied to the back surface, wherein the facestock material is releasable adhered to the release liner;*
   *c. wherein:*
      *i. the facestock material has formed therein a first label and a second label,*
      *ii. the facestock material includes a weakened separation line,*
      *iii. the first label has a shape and a surface that is adhered to the release liner,*
      *iv. the second label has a shape and a surface that is adhered to the release liner,*
      *v. the first label and the second label are adjacent to one another and are separated by a cut in the facestock material,*
      *vi. the cut in the facestock material between the first label and the second label defines at least a portion of the first label's shape and a portion of the second label's shape,*
      *vii. a portion of the release liner is configured to be separated from a part of the first label and a part of the second label with the majority of both the first label's surface and the second label's surface remaining adhered to another portion of the release liner,*
      *viii. the release liner includes a weakened separation line that underlies the first label and the second label,*
      *ix. the label sheet assembly is configured to be placed on a flat surface after the separation of the portion of the release liner from the part of the first label without creating an adhesive bond between the first label and the flat surface, and*
      *x. the label sheet assembly is configured to be fed through a desktop printer.*

36. *The label sheet assembly according to claim 35, wherein the facestock material's weakened separation line is generally parallel to the release liner's weakened separation line.*

37. *The label sheet assembly according to claim 35, wherein the label sheet assembly is configured to be simultaneously torn by a user along both the release liner's weakened separation line and the facestock material's weakened separation line.*

38. *A label sheet assembly comprising:*
   *a. a thin, flexible release liner that is a single sheet; and*
   *b. facestock material having a printable surface, a back surface, and a pressure-sensitive adhesive applied to the back surface, wherein the facestock material is releasable adhered to the release liner;*
   *c. wherein:*
      *i. the facestock material has formed therein a first label and a second label,*
      *ii. the first label has a shape and a surface that is adhered to the release liner,*
      *iii. the second label has a shape and a surface that is adhered to the release liner,*
      *iv. the first label and the second label are adjacent to one another and are separated by a cut in the facestock material,*
      *v. the cut in the facestock material between the first label and the second label defines at least a portion of the first label's shape and a portion of the second label's shape,*
      *vi. a portion of the release liner is configured to be separated from a part of the first label and a part of the second label with the majority of both the first label's surface and the second label's surface remaining adhered to another portion of the release liner,*
      *vii. the label sheet assembly is configured to be placed on a flat surface after the separation of the portion of the release liner from the part of the first label without creating an adhesive bond between the first label and the flat surface,*
      *viii. the label sheet assembly further includes an edge,* ix. the label sheet assembly includes facestock material between the first label and the label sheet assembly's edge;

x. the facestock material between the label sheet assembly's edge and the first label is configured to be torn by a user, and xi. the label sheet assembly is configured to be fed through a desktop printer.

39. A label sheet assembly comprising:
   a. a thin, flexible release liner;
   b. facestock material having a printable surface, a back surface, and a pressure-sensitive adhesive applied to the back surface, wherein the facestock material is releasably adhered to the release liner; and
   c. a label sheet assembly edge;
   d. wherein:
      i. the facestock material has formed therein a first label and a second label,
      ii. the facestock material has formed therein a matrix between the first label and the label sheet assembly edge,
      iii. the first label is adhered to the release liner,
      iv. the second label is adhered to the release liner,
      v. the first label and the second label are adjacent to one another and are separated by a cut in the facestock material,
      vi. a portion of the release liner is configured to be separated from a part of the first label and a part of the second label so that a portion of the first label's surface and a portion of the second label's surface is exposed while the majority of both the first label's surface and the second label's surface remains adhered to another portion of the release liner,
      vii. the label sheet assembly is configured to be placed on a flat surface after the separation of the portion of the release liner from the part of the first label without creating an adhesive bond between the first label and the flat surface, and
      viii. the label sheet assembly is configured to be fed through a desktop printer.

40. The label sheet assembly according to claim 39, wherein the matrix is configured to be torn by a user.

41. The label sheet assembly according to claim 39, wherein:
   a. the release liner includes a weakened separation line that underlies the first label and the second label; and
   b. the matrix overlies a portion of the weakened separation line.

42. The label sheet assembly according to claim 41, wherein both the matrix and the liner sheet are configured to be torn by a user when the liner sheet is torn by the user along the weakened separation line.

43. A label sheet assembly comprising;
   a. a thin, flexible release liner including a weakened separation line; and
   b. facestock material having a printable surface, a back surface, and a pressure-sensitive adhesive applied to the back surface, wherein the facestock material is releasably adhered to the release liner, wherein the facestock material includes a weakened separation line;
   c. wherein:
      i. the facestock material has formed therein a first label and a second label,
      ii. the first label has a shape, an edge, and a surface,
      iii. the first label's surface is adhered to the release liner,
      iv. the second label has a shape, an edge, and a surface,
      v. the second label's surface is adhered to the release liner,
      vi. the first label and the second label are adjacent to one another and separated by a cut in the facestock material,
      vii. the release liner's weakened separation line underlies the first label, the second label, and the cut in the facestock material,
      viii. the release liner's weakened separation line is offset from the first label's edge and the second label's edge,
      ix. the cut in the facestock material between the first label and the second label defines at least a portion of the first label's shape and a portion of the second label's shape,
      x. the facestock material's weakened separation line is generally parallel to the release liner's weakened separation line,
      xi. the label sheet assembly is configured to be torn by a user simultaneously along both the release liner's weakened separation line and the facestock material's weakened separation line so that a portion of the first label's surface and a portion of the second label's surface is exposed while the majority of both the first label's surface and the second label's surface remains adhered to the release liner,
      xii. the label sheet assembly is configured to be placed on a flat surface after the portion of the first label's surface is exposed without creating an adhesive bond between the first label and the flat surface, and
      xiii. the label sheet assembly is configured to be fed through a desktop printer.

\* \* \* \* \*